US009280741B2

(12) United States Patent
Thapliyal et al.

(10) Patent No.: US 9,280,741 B2
(45) Date of Patent: Mar. 8, 2016

(54) AUTOMATED ALERTING RULES RECOMMENDATION AND SELECTION

(71) Applicant: Citrix Systems, Inc., Ft. Lauderdale, FL (US)

(72) Inventors: Ashish V. Thapliyal, Santa Barbara, CA (US); Adam Torres, Santa Barbara, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 274 days.

(21) Appl. No.: 13/874,522

(22) Filed: May 1, 2013

(65) Prior Publication Data
US 2014/0330756 A1  Nov. 6, 2014

(51) Int. Cl.
*G06N 5/02* (2006.01)

(52) U.S. Cl.
CPC ................................... *G06N 5/025* (2013.01)

(58) Field of Classification Search
None
See application file for complete search history.

(56) References Cited

U.S. PATENT DOCUMENTS

| 6,023,507 | A | 2/2000 | Wookey |
| 6,697,962 | B1 | 2/2004 | McCrory et al. |
| 7,246,160 | B2 | 7/2007 | Yamabe |
| 8,958,537 | B1* | 2/2015 | Saylor ...................... 379/207.16 |
| 2008/0198752 | A1* | 8/2008 | Fan et al. ...................... 370/238 |
| 2009/0063580 | A1* | 3/2009 | Allen et al. ................... 707/202 |
| 2010/0153316 | A1* | 6/2010 | Duffield et al. ................. 706/12 |
| 2011/0167109 | A1* | 7/2011 | Papchenko et al. ........... 709/203 |
| 2011/0202495 | A1* | 8/2011 | Gawlick .......................... 706/59 |
| 2011/0218920 | A1* | 9/2011 | Agrawal et al. ................ 705/50 |
| 2011/0225275 | A1* | 9/2011 | Shah et al. ..................... 709/223 |

* cited by examiner

*Primary Examiner* — Kakali Chaki
*Assistant Examiner* — Michael Zidanic
(74) *Attorney, Agent, or Firm* — BainwoodHuang

(57) ABSTRACT

An improved technique involves a device monitoring system providing alerting rules for a particular computing environment automatically based on existing alerting rules sets for other computing environments. Along these lines, when an IT professional monitors a computing environment through the device monitoring system, the device monitoring system stores alerting rules sets for that computing environment in a database. In storing rules sets and other information about that and other computing environments, the device monitoring system acquires intelligence from a wealth of data concerning how other IT professionals react to configuration changes in their computing environments. In this way, the device monitoring system then suggests alerting rules for a particular computing environment whose alerting rules are found to be suboptimal based on performance data from the particular computing environment.

21 Claims, 5 Drawing Sheets

| 40 | 42 | 44 |
|---|---|---|
| Configuration Change | Alert? | Alert Type |
| 46   New Software Installed | Yes | Email |
| Internet Security Configuration Changed | Yes | Email |
| Additional Computer Installed | No | ------ |
| BIOS Parameters Changed | Yes | MSM |

100

Storing multiple alerting rule sets in a rule set database, the multiple alerting rule sets providing sets of alerts when applied to configuration data of existing computing environments
102

Selecting particular alerting rules among the multiple alerting rule sets stored in the rule set database, the particular alerting rules providing a particular set of alerts when applied to configuration data of an existing computing environment
104

Providing the particular alerting rules to the particular computing environment
106

Figure 5

AUTOMATED ALERTING RULES RECOMMENDATION AND SELECTION

BACKGROUND

Cloud-based information technology (IT)-based monitoring systems enable IT professionals to monitor customer systems from a remote location. For example, suppose that a small company has an inventory of 100 desktop PCs for its employees' use. Suppose further that each of those PCs has the same configuration according to a company policy. An IT professional whose job is to oversee the operation of the company's PCs uses such an IT-based monitoring system to make sure the PCs are operating without critical problems, and operate according to the company policy. This means that the IT professional uses the monitoring system to identify possible problems such as disk failure, network failure, and configuration changes to the PCs and decide whether or not to take corrective action.

Some IT-based monitoring systems provide automated alerts to the IT professional when there is a failure of a computing system, or an unplanned configuration change or when a critical threshold for failures or change events is met within a group of computing devices which that IT professional is monitoring. Such alerts come in the form of emails, SMS messages, and the like, and provide the IT professional real-time reaction to computer errors and failures, and potentially dangerous configurations that may be the result of an outside attack on a network or internal theft. For example, the monitoring system may send the IT professional an alert in response to a disk errors logged in the system log, a service liveness test failing (e.g. a internal web server is down) or internet security software being disabled on an employee's computer.

The number of possible problems for which the monitoring system may send the IT professional an alert, however, is potentially enormous. To that effect, a conventional IT-based monitoring system allows an IT professional to manually tailor a set of alerting conditions in order to filter out those that are unimportant. In this way, the IT professional may tailor the alerting system to cover and appropriately prioritize (e.g. critical problems result in a phone call, less critical ones in an email, etc.) those problems which he or she knows from experience need the utmost attention.

SUMMARY

Unfortunately, there are deficiencies with the above-described conventional IT-based monitoring system. For example, such a manual selection of problem indicators and alerting conditions tends to be burdensome and error-prone for the IT professional that monitors a group of computing devices. Further, the selection of problem indicators and alerting conditions is based solely on that particular IT professional's experience and ignores the greater wealth of experience of IT professionals monitoring similar customer systems. Accordingly, the IT professional may not be properly made aware of all the problems and could potentially put the customer system at risk.

In contrast to the conventional IT-based monitoring system which does not take advantage of intelligence about how IT professionals react to problems in the computing environments they are monitoring, an improved technique involves a device monitoring system providing alerting rules for a particular computing environment automatically based on existing alerting rules sets for other computing environments. Along these lines, when an IT professional monitors a computing environment through the device monitoring system, the device monitoring system stores alerting rules sets for that computing environment in a database. In storing rules sets and other information about that and other computing environments, the device monitoring system acquires intelligence from a wealth of data concerning how other IT professionals identify problems in their computing environments. In this way, the device monitoring system then suggests alerting rules for a particular computing environment whose alerting rules are found to be suboptimal based on performance data from the particular computing environment.

Advantageously, the improved technique provides for a more relevant alerting rule set to the particular computing environment, using a more efficient and less error-prone process. Because the device monitoring system actively stores other alerting rules and data from activity logs concerning how other IT professionals react to alerts sent from those alerting rules sets, it can use artificial intelligence methods to mine the data and determine which set of rules is most likely compatible with a particular computing environment given its historical activity and configuration. For example, supervised machine learning techniques are a robust way of determining which rules are important to which configurations. In this manner, an IT professional need not pore over hundreds, if not thousands, of possibilities of alerting rules to get to the best possible set for his or her computing environment's configuration.

One embodiment of the improved technique is directed to a method of providing alerting rules for a particular computing environment in a device monitoring system constructed and arranged to communicate alerts, via a set of alerting rules, in response to changes within a computing environment. The method includes storing multiple alerting rule sets in a rule set database, the multiple alerting rule sets providing sets of alerts when applied to configuration data of existing computing environments. The method also includes selecting particular alerting rules among the multiple alerting rule sets stored in the rule set database, the particular alerting rules providing a particular set of alerts when applied to configuration data of an existing computing environment. The method further includes providing the particular alerting rules to the particular computing environment.

Additionally, some embodiments of the improved technique are directed to a system constructed and arranged to provide alerting rules for a particular computing environment for communicating alerts, via a set of alerting rules, in response to changes within a computing environment. The system includes a network interface, memory, and a controller including controlling circuitry constructed and arranged to carry out the method of providing alerting rules for a particular computing environment.

Furthermore, some embodiments of the improved technique are directed to a computer program product having a non-transitory computer readable storage medium which stores code including a set of instructions which, when executed by a computer, cause the computer to carry out the method of providing alerting rules for a particular computing environment.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

FIG. 5 is a flow chart illustrating an example method of carrying out the improved technique within the electronic environment shown in FIG. 1.

DETAILED DESCRIPTION

An improved technique involves a device monitoring system providing alerting rules for a particular computing environment automatically based on existing alerting rules sets for other computing environments. Along these lines, when an IT professional monitors a computing environment through the device monitoring system, the device monitoring system stores alerting rules sets for that computing environment in a database. In storing rules sets and other information about that and other computing environments, the device monitoring system acquires intelligence from a wealth of data concerning how other IT professionals react to configuration changes in their computing environments. In this way, the device monitoring system then suggests alerting rules for a particular computing environment whose alerting rules are found to be suboptimal based on performance data from the particular computing environment.

Advantageously, the improved technique provides for a more relevant alerting rules set to the particular computing environment, using a more efficient and less error-prone process. Because the device monitoring system actively stores other alerting rules sets and data from activity logs concerning how other IT professionals react to alerts sent from those alerting rules sets, it can use artificial intelligence methods to mine the data and determine which set of rules is most likely compatible with a particular computing environment given its historical activity and configuration. For example, supervised machine learning techniques are a robust way of determining which rules are important to which computing environments. In this manner, an IT professional need not pore over hundreds, if not thousands, of possibilities of alerting rules to get to the best possible set for his or her computing environment's configuration.

Figure 1:
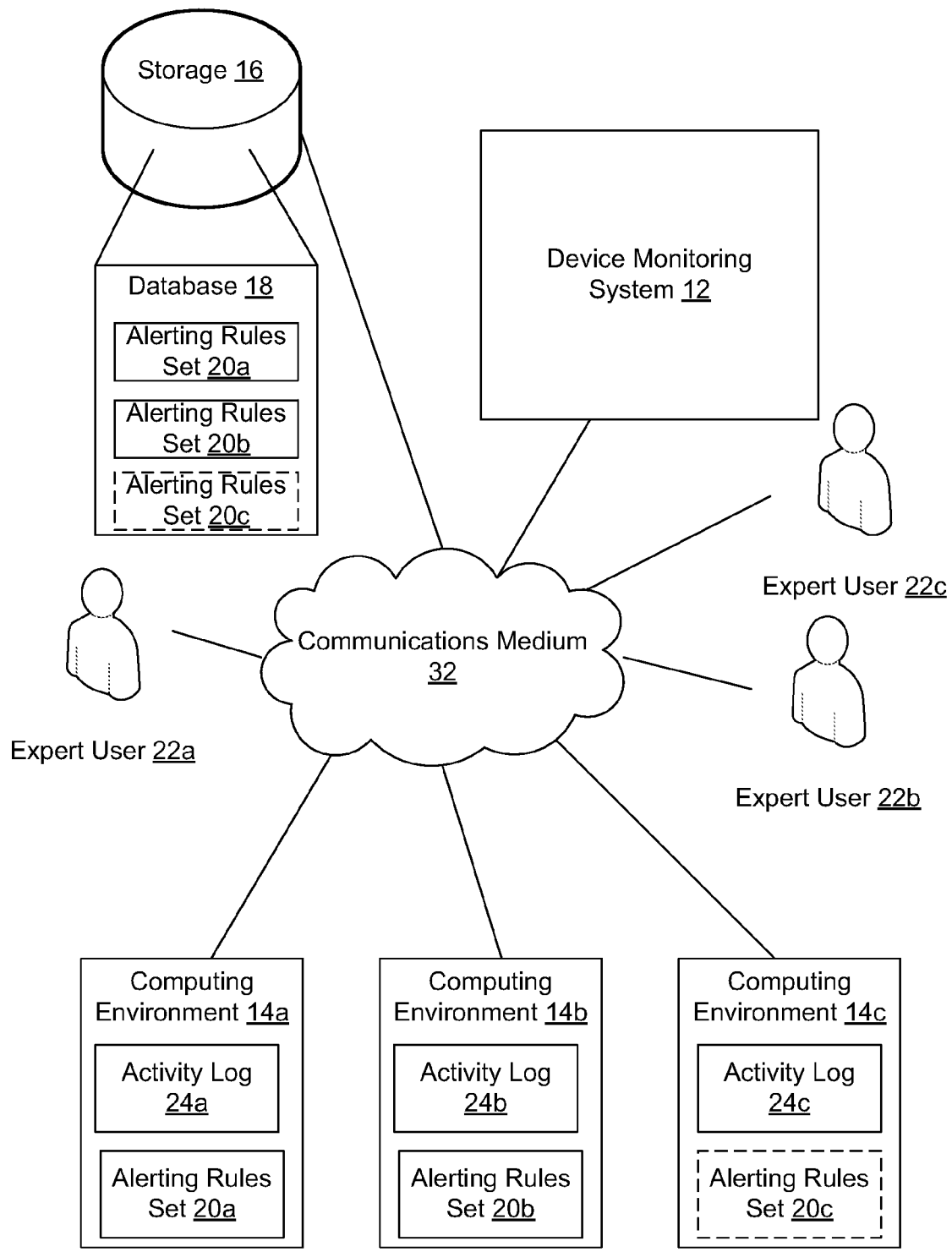
FIG. 1 is a block diagram illustrating an example electronic environment for carrying out the improved technique.

FIG. 1 illustrates an electronic environment 10 for carrying out the improved technique/Electronic environment 10 includes a device monitoring system 12, various computing environments 14a, 14b, and 14c (computing environments 14), a storage device 16 on which a database 18 is stored, and a communications medium 32.

Communication medium 32 provides network connections between device monitoring system 12, computing environments 14, and storage device 16. Communications medium 32 may implement a variety of protocols such as TCP/IP, UDP, ATM, Ethernet, Fibre Channel, combinations thereof, and the like. Furthermore, communications medium 32 may include various components (e.g., cables, switches/routers, gateways/bridges, NAS/SAN appliances/nodes, interfaces, etc.). Moreover, the communications medium 32 is capable of having a variety of topologies (e.g., queue manager-and-spoke, ring, backbone, multi drop, point to-point, irregular, combinations thereof, and so on).

Device monitoring system 12 is constructed and arranged to communicate alerts, via a set of alerting rules 20, in response to a change in configuration within a computing environment 14. In some arrangements, device monitoring system 12 takes the form of a server fixed in a central location. In other arrangements, however, device monitoring system 12 takes the form of a portable platform (e.g., a laptop or a tablet computer) through which an expert user 22 may monitor a computing environment 14.

Computing environments 14a, 14b, and 14c each include a collection of electronic computing devices (e.g., desktop computers, laptop computers, tablet computers, smartphones, and the like) that are connected via a network to communications medium 32 and, ultimately, device monitoring system 12. Also connected to computing environments 14a, 14b, and 14c, are expert users, respectively, 22a, 22b, and 22c (expert users 22); expert users 22 monitor their respective computing environments 14 from locations remote from computing environments 14. In some arrangements, however, expert users 14 are on-site, i.e., local to their respective computing environments 14.

For the purposes of the discussion to follow, it should be understood that each computing environment 14 includes an alerting rules set 20 (e.g., alerting rules 20a, 20b, and 20c), and an activity log 24 (e.g., activity logs 24a, 24b, and 24c).

Each alerting rules set 20 includes rules for deciding when to issue alerts. Each rule represents a logical condition on values of configuration parameters that describe how a computing environment 20 is set up. For a given computing environment 20, there are typically hundreds of rules (e.g., 100, 200, 300, or higher) that dictate allowable configuration conditions for computing environment 20. Some rules might originate with a corporate policy; others might be a result of the practical experience of one or many expert users 22. Further detail about alerting rules set 20 is described below with respect to FIG. 2.

Figure 2:
FIG. 2 is a block diagram illustrating an example device monitoring system within the electronic environment shown in FIG. 1.

FIG. 2 illustrates an example alerting rules set 20a. Alerting rules set 20a includes entries 46 having fields for configuration change 40, whether to issue an alert 42, and an alert type 44. In some arrangements, alerting rules sets include other fields representing bounds of numerical parameters representing some configuration state of an electronic device (e.g., clock speed on a processor).

In the example illustrated in FIG. 2, the configuration changes 40 listed include whether new software has been installed on a device, whether internet security configuration has changed for a device, whether an additional device is present in computing environment 14a, and whether someone had changed BIOS parameters, whether a service liveness test failed too many times, whether an error message was logged too many times in the error log. For example, suppose that computing environment 14a includes a set of desktop personal computers that belong to a company for use in an office. Expert user 22a has set up these computers according to a company policy so that each desktop computer has certain software loaded and has internet security software configured to particular settings that conform to the company policy. When a user attempts to change these settings (perhaps to enable theft of intellectual property or to access forbidden web pages) or install unapproved software on a machine, a machine in the computing environment—in some cases, a "crawler"—detects the change and consults alert rules set 20a. In these two cases, expert user 22a then receives an email from this machine detailing the configuration change. Expert user 22a then ostensibly reacts to the configuration change by, e.g., undoing the change, uninstalling the software, etc.

Returning to FIG. 1, activity logs 24 include all actions taken by the devices of computing environments 14. The devices of computing environment 14 record such reactions, as well as the configuration changes, error messages, liveness test failures, etc., that triggered the alerts, in activity log 24. Thus, while rules set 20 provide rules for alerting expert users 22 about particular configuration changes in computing environments 14, activity log 24 records the actions taken with regard to those alerts.

Storage device 16 is constructed and arranged to store database 18, and typically takes the form of enterprise storage, although smaller-scale storage devices such as hard disks, solid-state drives, and the like. Database 18 is configured to store data concerning computing environments 14, including alerting rules sets 20 and activity logs 24.

During operation, device monitoring system 12 collects data concerning alerting rules sets 20a, 20b, and 20c from computing environments 14a, 14b, and 14c, respectively. That rules sets 20 are available to device monitoring system 12 is no surprise because device monitoring system 12 helps expert users 22 create these rules sets 20. Expert users 22, or otherwise owners of computing environments 14, are aware that device monitoring system collects and stores this information about their computing environments because of a prior agreement.

Device monitoring system 12 then selects a particular computing environment, say, 20c, as being in need of further attention. For example, computing environment 20c may have been subject to an outside attack or internal theft, and a current alerting rules set may not have been set up to detect a change in configuration that allowed such an attack. In such a case, there is motivation to provide computing environment 20c with a better rules set 20c (represented by a dashed box in FIG. 1 as something to be provided). Nevertheless, there may be no other reason to provide computing environment 20c with a better rules set 20c than periodic maintenance.

Device monitoring system then selects a better set of alerting rules 20c from the rules sets 20 stored in database 18. This selection is to be based on the collective wisdom and experience of the other expert users 22 in the form of the stored rules sets 20. In this way, expert user 22c now has an alerting rules set 20c that is more likely to be effective, without going through a lengthy manual process of rules selection.

In some arrangements, device monitoring system 12 deduces information such as the expected configurations of computing environments 14 in determining which rules set of the rules sets 20 to select for computing environment 20c. Along these lines, device monitoring system 12 compares expected configurations of computing environment 20c to the expected configurations of the other computing environments stored in database 18. Further details about these expected configurations are described below with respect to FIG. 3.

Figure 3:
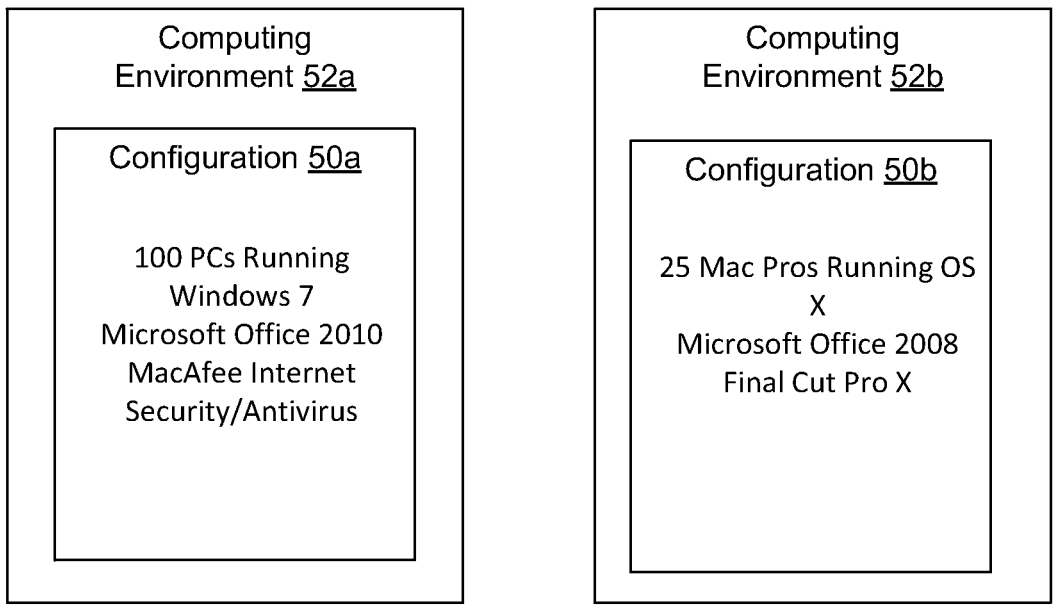
FIG. 3 is a block diagram illustrating example configurations of computing environments within the electronic environment shown in FIG. 1.
Figure 3:
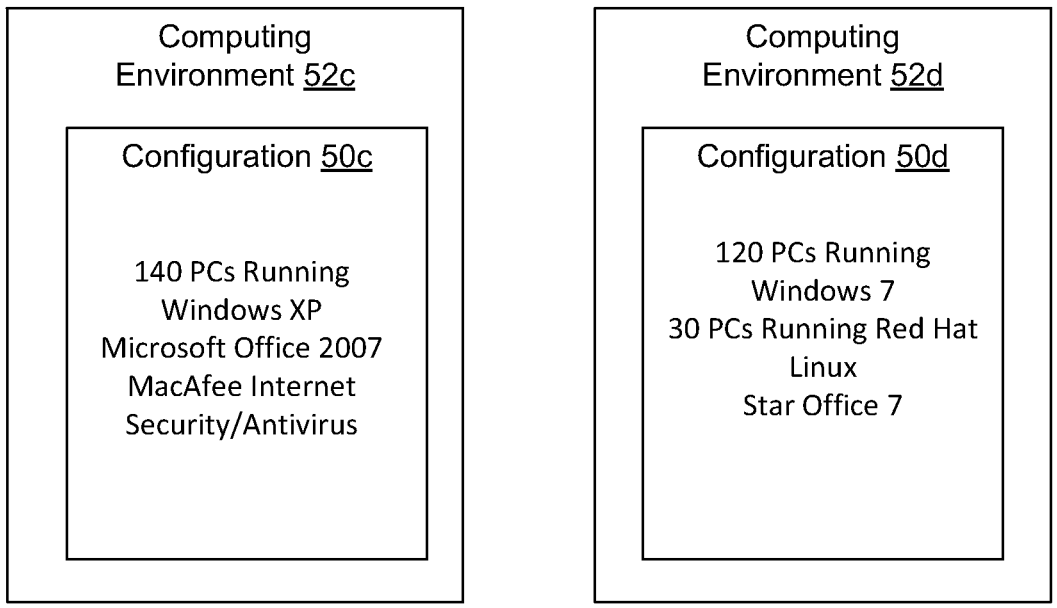

FIG. 3 illustrates example computing environments 52a, 52b, 52c, and 52d (computing environments 52). Each computing environment 52 has a corresponding expected configuration 50a, 50b, 50c, and 50d (expected configurations 50). For example, expected configuration 50a, corresponding to computing environment 52a, includes 100 personal computers that run Microsoft® Windows 7 as an operating system, run Microsoft® Office 2010 as an office suite, and MacAfee® Internet Security and Antivirus software. Expected configuration 50b includes 25 Apple® Macintosh Pro computers that run Apple® OS X as an operating system, Microsoft Office 2008 as an office suite, and Apple® Final Cut Pro as a video editing program. Expected configuration 52c includes 140 personal computers that run Microsoft® Windows XP as an operating system, run Microsoft® Office 2007 as an office suite, and MacAfee® Internet Security and Antivirus software. Expected configuration 52d includes 150 personal computers, 30 of which that run Red Hat Enterprise Linux 6, the rest of which run Microsoft® Windows 7 as an operating system, and run Star Office 7 as an office suite.

To determine which rules set 20 (see FIG. 1) goes best with computing environment 52c, for example, device monitoring system 12 performs a comparison between the other expected configurations 50 and provides the rules set to computing environment 52c that most closely matches its expected configuration 50. In the case illustrated in FIG. 3, it is likely that expected configuration 50a is closest to expected configuration 50c. In this case, device monitoring system 12 sends alerting rules set 20a to computing environment 52c via its expert user.

It should be understood that the selection process described above is automated within device monitoring system 12. To accomplish such automation, device monitoring system 12 defines a distance (or similarity) metric based on values of parameters defining the expected configurations 50. In some arrangements, device monitoring system 12 computes the distance metric between expected configuration 50c and each other expected configuration 50. Device monitoring system 12 then selects the set of alerting rules 20 corresponding to the computing environment 52 having the expected configuration 50 with the smallest value of the distance metric.

As an example, suppose that the distance metric is a sum over the absolute values of differences between various parameters values. For the operating system parameter, say Windows 7 has a value of 3, Windows XP has a value of 2, Mac OS X has a value of 7, and Linux has a value of 8. (For example, the expert users may agree on such a value system beforehand.) By comparing the absolute value of the differences, device monitoring system may automatically select set of alerting rules 20a based on such a metric.

In some arrangements, device monitoring system 12 establishes groups of similar computing environments 52. For example, device monitoring system 12 might establish computing environments 52a and 52c as being sufficiently similar to place them into a similarity group. An advantage of establishing similarity groups is that there are fewer distance metrics, or comparisons in general, that device monitoring system 12 must make in order to make a rules set selection.

In some arrangements, device monitoring system 12 also collects information concerning activity logs 24. As mentioned above, activity logs 24 contain information about how an expert user 22 reacts to a given alert. For example, an expert user 22 may choose to ignore certain alerts because he or she has found that the configuration change that triggered that alert was not all that important. In this case, device monitoring system 12 may weight each rule by the number of times that an expert user 22 performed a task within computing environment 52 in response to receiving an alert according to that rule.

An advantage of assigning weights to rules of a set of rules lies in the additional flexibility in constructing a rules set for a particular computing environment. If a rule from a rules set has a very small weight, it may be more efficient to simply remove it from the set. Further, if a rule in another rule set has a very large value, it may be worth considering in rules set selection because such an important rule may have a universal quality about it.

One mechanism for assigning weights to rules automatically is via a machine learning system that takes in training data in the form of feedback from activity logs. Such a system, as well as device monitoring system 12, is discussed in further detail with respect to FIG. 4 below.

Figure 4:
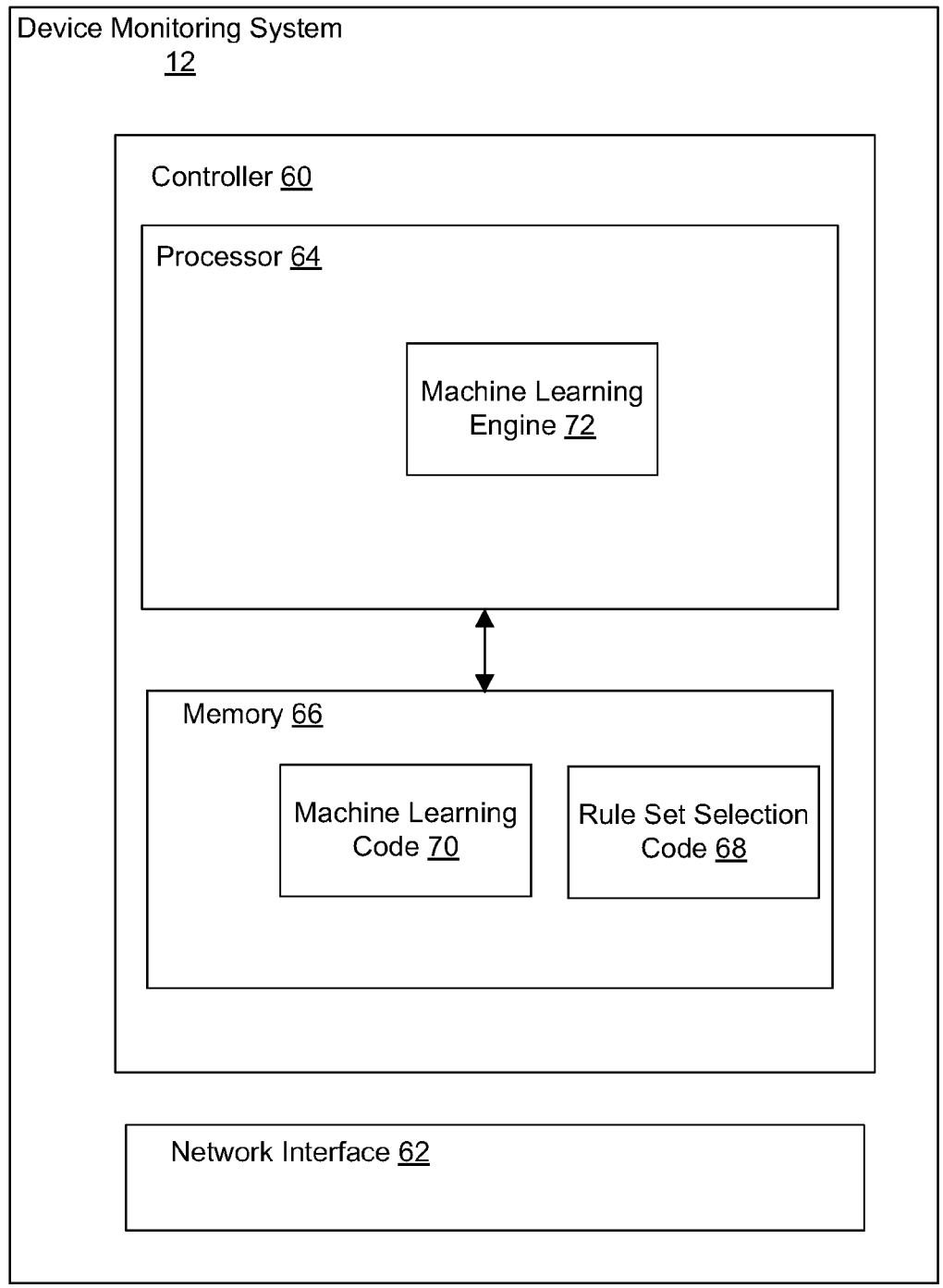
FIG. 4 is a chart illustrating an example alerting rules set within the electronic system shown in FIG. 1.

FIG. 4 illustrates an example device monitoring system 12 with a machine learning module within its body. Device monitoring system 12 includes controller 60, which in turn includes processor 64 and memory 66, and network interface 62.

Network interface 62 takes the form of an Ethernet card; in some arrangements, network interface 62 takes other forms including a wireless receiver and a token ring card.

Memory 66 is configured to store rule set selection code 58 that contains instructions configured to cause processor 64 to carry out the improved technique. Memory 66 is also configured to store machine learning code 60 which is configured to cause processor 64 to assign weights to rules according to data extracted from activity logs 24. Memory 66 generally takes the form of, e.g., random access memory, flash memory or a non-volatile memory.

Processor 64 takes the form of, but is not limited to, Intel or AMD-based MPUs, and can include a single or multi-cores each running single or multiple threads. In some arrangements, processor 64 is one of several processors working together. Processor 64 is configured to carry out the improved technique by executing rule set selection code 58 and machine learning code 60. Processor 44 includes machine learning which is configured to execute machine learning code 60.

It should be understood that machine learning implies a family of algorithms that are used to make predictions based on past data. That is, a machine learning algorithm in this context uses a set of machine learning parameters to relate input (activity log data) to output (weights for rules). The predictions here concern which set of rules will be most important to an expert user monitoring a computing environment with a given expected configuration 50.

During operation, processor 54 obtains a rules set 20 for a given expected configuration 50, as well as the activity log 24 corresponding to the computing environment 14 having that expected configuration. Processor 54 inputs data from activity log 54 into machine learning engine 62. In response, machine learning engine 62 outputs a set of weights corresponding to the rules. Processor 54 attaches these weights to their corresponding rules in that rules set 20.

When it comes time to send a rules set 20 to a particular computing environment 14, processor 54 examines the weights of the rules in that rules set and decides whether to include rules of that rules set based on the weights. Further, if a given rules set does not have enough rules with weights that have large enough values to be sent to the particular computing environment 14, then processor 54 may select another rules set from the computing environment 14 having an expected configuration 50 that has the next smallest value of the distance metric.

It should be understood that such a machine learning algorithm is supervised in that the machine learning parameters are periodically set using training data for which both input and output are known.

FIG. 5 illustrates a method 100, in a device monitoring system constructed and arranged to communicate alerts, via a set of alerting rules, in response to changes within a computing environment, of providing alerting rules for a particular computing environment, including steps 102, 104, and 106. In step 102, multiple alerting rule sets are stored in a rule set database, the multiple alerting rule sets providing sets of alerts when applied to configuration data of existing computing environments. In step 104, a particular alerting rule set is selected among the multiple alerting rule sets stored in the rule set database, the particular alerting rule set providing a particular set of alerts when applied to configuration data of an existing computing environment. In step 106, the particular alerting rule set is provided to the particular computing environment.

While various embodiments of the invention have been particularly shown and described, it will be understood by those skilled in the art that various changes in form and details may be made therein without departing from the spirit and scope of the invention as defined by the appended claims.

For example, while the above example device monitoring system 12 was described as being a server in a fixed position with respect to storage device 16, in some arrangements, device monitoring system 12 is a portable system that may move about any locations remote from computing environments 14 and storage device 16.

Further, the above discussion concerned configuration changes in computing environments 14. Nevertheless, in some arrangements, alerts may be based on errors in system logs which in turn may or may not be part of activity logs 24. For example, an alert may be issued when disk space is almost full. Also, there may be an agent that monitors the resources within computing environment 14 and sends data to device monitoring system 12. Moreover, that agent may send results of liveness tests on devices and services within computing environment 14 to device monitoring system 12.

Furthermore, it should be understood that some embodiments are directed to device monitoring system 12, which is constructed and arranged to provide alerting rules for a particular computing environment. Some embodiments are directed to a process of providing alerting rules for a particular computing environment. Also, some embodiments are directed to a computer program product which enables computer logic to provide alerting rules for a particular computing environment.

In some arrangements, device monitoring system 12 is implemented by a set of processors or other types of control/processing circuitry running software. In such arrangements, the software instructions can be delivered, within device monitoring system 12, either in the form of a computer program product (see code 58, for example) or simply instructions on disk or in pre-loaded in memory 66 of device monitoring system 12, each computer program product having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. In a device monitoring system constructed and arranged to communicate alerts, via a set of alerting rules, in response to changes within a computing environment, a method of providing alerting rules for a particular computing environment, the method comprising:

storing multiple alerting rule sets in a rule set database, the multiple alerting rule sets providing sets of alerts when applied to configuration data of existing computing environments;

selecting particular alerting rules among the multiple alerting rule sets stored in the rule set database, the particular alerting rules providing particular alerts when applied to configuration data of an existing computing environment; and providing the particular alerting rules to the particular computing environment, wherein each existing computing environment is managed by an expert user, each expert user receiving alerts from the device monitoring system in response to configuration changes within the existing computing environment managed by that expert user according to an alerting rule set stored in the rule set database, wherein each alerting rule of the multiple alerting rule sets includes (i) a configuration change identifier identifying a configuration change in an existing computing environment and (ii) a respective alert indicator indicating whether an alert is to be issued in response to the configuration change identified by the configuration change identifier, wherein selecting the particular alerting rules includes:
performing a comparison operation between the existing computing environments and the particular computing environment, the comparison operation producing a comparison result indicative of whether the existing computing environments are similar to the particular computing environment; and
picking, as the particular alerting rules, rules from the multiple alerting rule sets based on the comparison result.

2. A method as in claim 1,
wherein performing the comparison operation includes:
deriving, from the existing computing environments, groups of similar computing environments, each group of similar computing environment including computing environments having similar characteristics according to a similarity metric, each group of similar computing environments having a common alerting rule set, the particular alerting rule set being selected according to which group of similar computing environments the new computing environment is most similar according to the similarity metric.

3. A method as in claim 1,
wherein each existing computing environment has an expected configuration, an alerting rule set for that existing computing environment including rules for alerting when configuration data of that existing computing environment differs from the expected configuration; and
wherein performing the comparison operation includes:
comparing the expected configuration of the new computing environment to the expected configuration of at least one existing computing environment.

4. A method as in claim 3,
wherein the expected configuration of the existing computing environment includes values of a set of configuration parameters, each alerting rule of the alerting rule set including a constraint on a value of at least one configuration parameter of the set of configuration parameters; and
wherein performing the comparison operation further includes:
assigning a weight to each alerting rule of the alerting rule set to form a set of weights, the weight being indicative of a level of importance of the imposition of that alerting rule to the existing computing environment.

5. A method as in claim 4,
wherein the existing computing environment includes an activity log, the activity log including entries corresponding to an action taken by a user of the existing computing environment in response to a change in the configuration of the existing computing environment; and
wherein assigning the weight to that alerting rule of the alerting rule set includes:
inputting the values of the set of configuration parameters into a machine learning system, the machine learning system being configured to output a set of weights for the alerting rules of the alerting rules set based on a historical trend of the entries of the activity log.

6. A method as in claim 5,
wherein the machine learning system employs a supervised learning technique in which output of the machine learning system depends on a set of training data which includes entries from the activity log; and
wherein assigning the weight to that alerting rule of the alerting rule set further includes:
inputting the entries from the activity log of the existing computing environment into the machine learning system.

7. A method as in claim 5,
wherein assigning the weight to that alerting rule of the alerting rule set further includes:
receiving feedback from an existing computing environment in response to the existing computing environment reacting to an alert, and
inputting the feedback into the machine learning system.

8. A method as in claim 5,
wherein assigning the weight to that alerting rule of the alerting rule set further includes:
monitoring the reaction of an expert user to receiving an alert according to the alerting rule set for the computing environment managed by that expert user, and
inputting the monitored reaction of the expert user into the machine learning system.

9. A method as in claim 1, further comprising:
verifying whether other computing environments may benefit from the particular alerting rule set;
sending the particular alerting rules to another computing environment when the particular alerting rule set benefits that computing environment; and
not sending the particular alerting rules to that computing environment when the particular alerting rule set does not benefit that computing environment.

10. A device monitoring system constructed and arranged to provide alerting rules for a particular computing environment for communicating alerts, via a set of alerting rules, in response to a changes within a computing environment, the device monitoring system comprising:
a network interface;
memory; and
a controller including controlling circuitry, the controlling circuitry being constructed and arranged to:
store multiple alerting rule sets in a rule set database, the multiple alerting rule sets providing sets of alerts when applied to configuration data of existing computing environments;
select particular alerting rules among the multiple alerting rule sets stored in the rule set database, the particular alerting rules providing particular alerts when applied to configuration data of an existing computing environment; and
provide the particular alerting rules to the particular computing environment;
wherein each existing computing environment is managed by an expert user, each expert user receiving alerts from the device monitoring system in response to configuration changes within the existing computing environment managed by that expert user according to an alerting rule set stored in the rule set database,
wherein each alerting rule of the multiple alerting rule sets includes (i) a configuration change identifier identifying a configuration change in an existing computing environment and (ii) a respective alert indicator indicating whether an alert is to be issued in response to the configuration change identified by the configuration change identifier, wherein selecting the particular alerting rules includes:
performing a comparison operation between the existing computing environments and the particular computing environment, the comparison operation producing a comparison result indicative of whether the existing computing environments are similar to the particular computing environment; and
picking, as the particular alerting rules, rules from the multiple alerting rule sets based on the comparison result.

11. A device monitoring system as in claim 10,
wherein performing the comparison operation includes:
deriving, from the existing computing environments, groups of similar computing environments, each group of similar computing environment including computing environments having similar characteristics according to a similarity metric, each group of similar computing environments having a common alerting rule set, the particular alerting rule set being selected according to which group of similar computing environments the new computing environment is most similar according to the similarity metric.

12. A device monitoring system as in claim 10,
wherein each existing computing environment has an expected configuration, an alerting rule set for that existing computing environment including rules for alerting when configuration data of that existing computing environment differs from the expected configuration; and
wherein performing the comparison operation includes:
comparing the expected configuration of the new computing environment to the expected configuration of at least one existing computing environment.

13. A device monitoring system as in claim 12,
wherein the expected configuration of the existing computing environment includes values of a set of configuration parameters, each alerting rule of the alerting rule set including a constraint on a value of at least one configuration parameter of the set of configuration parameters; and
wherein performing the comparison operation further includes:
assigning a weight to each alerting rule of the alerting rule set to form a set of weights, the weight being indicative of a level of importance of the imposition of that alerting rule to the existing computing environment.

14. A device monitoring system as in claim 13,
wherein the existing computing environment includes an activity log, the activity log including entries corresponding to an action taken by a user of the existing computing environment in response to a change in the configuration of the existing computing environment; and
wherein assigning the weight to that alerting rule of the alerting rule set includes:
inputting the values of the set of configuration parameters into a machine learning system, the machine learning system being configured to output a set of weights for the alerting rules of the alerting rules set based on a historical trend of the entries of the activity log.

15. A device monitoring system as in claim 14,
wherein the machine learning system employs a supervised learning technique in which output of the machine learning system depends on a set of training data which includes entries from the activity log; and
wherein assigning the weight to that alerting rule of the alerting rule set further includes:
inputting the entries from the activity log of the existing computing environment into the machine learning system.

16. A device monitoring system as in claim 14,
wherein assigning the weight to that alerting rule of the alerting rule set further includes:
receiving feedback from an existing computing environment in response to the existing computing environment reacting to an alert, and
inputting the feedback into the machine learning system.

17. A device monitoring system as in claim 14,
wherein assigning the weight to that alerting rule of the alerting rule set further includes:
monitoring the reaction of an-expert user to receiving an alert according to the alerting rule set for the computing environment managed by that expert user, and
inputting the monitored reaction of the expert user into the machine learning system.

18. A computer program product having a non-transitory, computer-readable storage medium which, in a device monitoring system constructed and arranged to communicate alerts, via a set of alerting rules, in response to changes within a computing environment, stores code for providing alerting rules for a particular computing environment, the code including instructions which, when executed by a computer, causes the computer to:
store multiple alerting rule sets in a rule set database, the multiple alerting rule sets providing sets of alerts when applied to configuration data of existing computing environments;
select particular alerting rules among the multiple alerting rule sets stored in the rule set database, the particular alerting rules providing particular alerts when applied to configuration data of an existing computing environment; and
provide the particular alerting rules to the particular computing environment,
wherein each existing computing environment is managed by an expert user, each expert user receiving alerts from the device monitoring system in response to configuration changes within the existing computing environment managed by that expert user according to an alerting rule set stored in the rule set database,
wherein each alerting rule of the multiple alerting rule sets includes (i) a configuration change identifier identifying a configuration change in an existing computing environment and (ii) a respective alert indicator indicating whether an alert is to be issued in response to the configuration change identified by the configuration change identifier,
wherein selecting the particular alerting rules includes:
performing a comparison operation between the existing computing environments and the particular computing environment, the comparison operation producing a comparison result indicative of whether the existing computing environments are similar to the particular computing environment; and
picking, as the particular alerting rules, rules from the multiple alerting rule sets based on the comparison result.

19. A method as in claim 2, wherein each of the existing computing environments includes a set of electronic devices;

wherein the configuration data of each of the existing computing environments specifies an operating system run by the set of electronic devices of that existing computing environment; and wherein deriving the groups of similar computing environments includes:
  assigning a numerical score to each existing computing environment based on the operating system specified by the configuration data of that existing computing environment;
  producing, as a value of the similarity metric, a difference between the numerical score assigned to an existing computing environment and a numerical score assigned to the particular computing environment.

20. A method as in claim 1, further comprising, prior to selecting the particular alerting rules:
  receiving data indicating an occurrence of a security incident within the particular computing environment; and
  in response to receipt of the data, initiating the selection of the particular alerting rules, the particular alerting rules being selected so as to prevent another occurrence of the security incident.

21. A method as in claim 1, wherein the configuration change identified by the configuration change identifier of each alerting rule is one of a set of configuration changes, the set of configuration changes including (i) installation of new software on a device within the particular computing environment, (ii) change in internet security configuration of a device within the particular computing environment, and (iii) addition of a new device within the particular computing environment.

* * * * *